(12) United States Patent
Knoll et al.

(10) Patent No.: US 10,995,737 B2
(45) Date of Patent: May 4, 2021

(54) CHARGE SEPARATION MECHANISM

(71) Applicants: AIRBUS DEFENCE AND SPACE LIMITED, Stevenage (GB); University of Surrey, Guildford (GB)

(72) Inventors: Aaron Knoll, Guildford (GB); Paolo Bianco, Portsmouth (GB)

(73) Assignee: AIRBUS DEFENCE AND SPACE LIMITED, Stevenage (GB)

( * ) Notice: Subject to any disclaimer, the term of this patent is extended or adjusted under 35 U.S.C. 154(b) by 434 days.

(21) Appl. No.: 15/573,248

(22) PCT Filed: May 12, 2016

(86) PCT No.: PCT/EP2016/060791
§ 371 (c)(1),
(2) Date: Nov. 10, 2017

(87) PCT Pub. No.: WO2016/180955
PCT Pub. Date: Nov. 17, 2016

(65) Prior Publication Data
US 2018/0106243 A1    Apr. 19, 2018

(30) Foreign Application Priority Data

May 13, 2015  (EP) ..................................... 15275136

(51) Int. Cl.
*F03H 1/00*    (2006.01)
*H02K 44/10*    (2006.01)
(Continued)

(52) U.S. Cl.
CPC ......... *F03H 1/0012* (2013.01); *F03H 1/0037* (2013.01); *F03H 1/0075* (2013.01);
(Continued)

(58) Field of Classification Search
CPC .. H02K 44/08; H02N 3/00; F03H 1/00; F03H 1/0006; F03H 1/0037; F03H 1/0043;
(Continued)

(56) References Cited

U.S. PATENT DOCUMENTS 3,303,364 A    2/1967  Hals
4,218,629 A *  8/1980  Kayukawa ............. H02K 44/08
                                                310/11
(Continued)

FOREIGN PATENT DOCUMENTS

CN    1167214 A    12/1997
CN    1213883 A    4/1999
(Continued)

OTHER PUBLICATIONS

Smirnov "Plasma measurements in a 100 W cylindrical Hall thruster" (Year: 2004).*
(Continued)

*Primary Examiner* — Gerald L Sung
*Assistant Examiner* — William L Breazeal
(74) *Attorney, Agent, or Firm* — Marshall, Gerstein & Borun LLP

(57) ABSTRACT

A method of producing a charge separation in a plasma having a low particle density which comprises a plurality of electrons and a plurality of positive ions. The method includes generating a magnetic field and passing the plasma having a low particle density along a first axis through the magnetic field. The magnetic field is generated having a component which is perpendicular to the first axis and is configured so as to deflect the plurality of electrons from the first axis and allow the plurality of positive ions to travel substantially undeflected along the first axis. Also provided is a magnetohydrodynamic generator and a low earth orbit thruster making use of the charge separation mechanism.

8 Claims, 5 Drawing Sheets

(51) Int. Cl.
- *H02K 44/16* (2006.01)
- *H02K 44/08* (2006.01)
- *H02N 3/00* (2006.01)

(52) U.S. Cl.
CPC .......... *F03H 1/0081* (2013.01); *H02K 44/08* (2013.01); *H02K 44/10* (2013.01); *H02K 44/16* (2013.01); *H02N 3/00* (2013.01); *H02K 44/085* (2013.01)

(58) Field of Classification Search
CPC .... F03H 1/0056; F03H 1/0062; F03H 1/0068; F03H 1/0075; F03H 1/0081; F03H 1/0087; F03H 1/0018; B64G 1/428
See application file for complete search history.

(56) References Cited

U.S. PATENT DOCUMENTS

| | | | |
|---|---|---|---|
| 5,289,998 A * | 3/1994 | Bingley | B64G 1/443 244/172.7 |
| 6,803,705 B2 | 10/2004 | Kornfeld et al. | |
| 7,247,993 B2 | 7/2007 | Kornfeld et al. | |
| 8,601,816 B2 | 12/2013 | Walker | |
| 9,121,082 B2 | 9/2015 | Marston et al. | |
| 2003/0046921 A1 * | 3/2003 | Hruby | F03H 1/0012 60/202 |
| 2008/0233017 A1 | 9/2008 | Sato et al. | |
| 2016/0047364 A1 * | 2/2016 | Haque | F03H 1/0018 60/203.1 |
| 2016/0207642 A1 * | 7/2016 | Longmier | F03H 1/0018 |

FOREIGN PATENT DOCUMENTS

| | | |
|---|---|---|
| CN | 1418290 A | 5/2003 |
| CN | 1741936 A | 3/2006 |
| CN | 101350551 A | 1/2009 |
| CN | 103117640 A | 5/2013 |
| CN | 104520453 A | 4/2015 |
| JP | S39028689 Y1 | 9/1964 |
| JP | S44001500 Y1 | 1/1969 |
| JP | S6110900 A | 1/1986 |
| JP | H10313566 A | 11/1998 |
| JP | 2001190088 A | 7/2001 |
| JP | 2006147449 A | 6/2006 |
| JP | 2008223655 A | 9/2008 |

OTHER PUBLICATIONS

Fujino "Performance Characteristics of Onboard Hall-Type Magnetohydrodynamic Generator During Earth Reentry Flight" (Year: 2015).*
Brian "How Electricity Works" (Year: 2005).*
Lexico "Plasma Frequency" (Year: 2004).*
Linnell "Hall Thruster Electron Motion Characterization Based on Internal Probe Measurements" (Year: 2009).*
Metin's Media and Math "The Fourth State of Matter—Plasmas" (Year: 2013).*
Martinez "Analysis of Magnetic Nozzles for Space Plasma Thrusters" (Year: 2013).*
Office Action, Japanese Patent Application No. 2017-557936, dated Feb. 22, 2019.
International Preliminary Report on Patentability for International application No. PCT/EP2016/060791, dated Nov. 23, 2017.
Buford Ray Conley et al "Utilization of ambient gas as a propellant for low earth orbit electric propulsion", Jul. 7, 1995 (Jul. 7, 1995), XP055237332, Retrieved from the Internet: URL:http.//dspace.mit.edu/bitstream/handle/1721.1/31061/33887503-MIT.pdf?sequence=2.
"Gridded electrostatic ion engine", Jul. 24, 2006 (Jul. 24, 2006), XP055237658, Internet Retrieved from the Internet: <URL:http://en.wikipedia.org/wiki/Ion_thrusteriPmedia/> File:Ion_engine.svg.
Examination Report, Chinese Application No. 2016800277806, dated Jun. 4, 2019.
Reconsideration Report Before Appeal for Japanese Patent Application No. 2017-557936 dated Jul. 30, 2020.

* cited by examiner

CHARGE SEPARATION MECHANISM

CROSS REFERENCE TO RELATED APPLICATIONS

This is the U.S. National Phase of International Application PCT/EP2016/060791, filed May 12, 2016, which claims priority from European Patent Application No. 15275136.8, filed on May 13, 2015, the contents of each of which are incorporated herein in their entirety by reference.

TECHNICAL FIELD

The present invention relates to magnetohydrodynamics and particularly, but not exclusively, to a mechanism for the separation of positive and negative charges in an electrically conductive fluid.

BACKGROUND ART

The study of magnetohydrodynamics (MHD) concerns the behaviour of electrically conductive fluids in an external magnetic field. Movement of an electrically conductive fluid in a static magnetic field results in a Lorentz force which acts on the charge carriers to generate currents within the fluid. The Lorentz force acts in a direction which is perpendicular both to the direction of motion and to the magnetic field, as defined by the equation:

$$F = q(v \times B)$$

where F is the Lorentz force, q is the charge of a particle moving through a magnetic field B with velocity v.

By moving an electrically conductive fluid through a perpendicular magnetic field, it is possible to achieve charge separation of carriers in the fluid. Where the fluid is sea water, for example, the positive and negative ions will separate, due to the associated Lorentz forces acting in opposite directions, and so the technique can be used in desalination. The charge separation establishes an electrical potential across a third axis, which can be harnessed in an MHD generator to drive a current by applying the potential across a resistive load. MHD generators typically employ seawater, plasma, molten salts or molten metal as the electrically conductive fluid.

Power output from an MHD generator is governed primarily by the flow rate and conductivity of the electrically conductive fluid. Therefore a conventional plasma MHD generator typically uses a hot, dense plasma to ensure maximum conductivity. A conventional MHD generator needs to be large in order to ensure sufficient flow rate of the fluid and sufficient magnetic fields in order to bring about the required charge separation. Typically the dense materials which are used limits MHD to terrestrial applications.

The present invention aims to overcome such restrictions, resulting in a smaller generator which requires a much lower magnetic field to be applied than conventional generators, thereby significantly increasing the number of possible applications.

SUMMARY OF INVENTION

According to an aspect of the present invention, there is provided a method of producing a charge separation in a plasma having a low particle density which includes a plurality of electrons and a plurality of positive ions. The method includes generating a magnetic field and passing the plasma having a low particle density along a first axis through the magnetic field. The magnetic field is generated having a component which is perpendicular to the first axis and is configured so as to deflect the plurality of electrons from the first axis and allow the plurality of positive ions to travel substantially undeflected along the first axis.

The plasma having a low particle density may be a substantially ideal plasma in which the plurality of positive ions and the plurality of electrons move substantially independently of one another.

A plasma frequency of the plasma having a low particle density may be larger than a particle collision frequency of the plasma having a low particle density. A particle density of the plasma may be lower than $10^{20}$ m$^{-3}$.

The magnetic field may deflect the plurality of electrons to travel in a closed drift loop around the first axis.

The perpendicular component of the magnetic field may extend in a radial direction with respect to the first axis.

The magnetic field may be formed by a plurality of ring magnets which are arranged in a series of adjacent rings in alignment with the first axis. The plurality of ring magnets may be arranged so that the polarity of each ring is opposite to the polarity of each adjacent ring in the series.

A current may be generated using a first electrode arranged to collect the plurality of positive ions which are substantially undeflected by the magnetic field.

The current may be generated by connecting the first electrode through a load to a ground connection.

The current may be generated by connecting the first electrode through a load to a second electrode arranged to collect the plurality of electrons which are deflected by the magnetic field.

The plasma having a low particle density may include one or more ionised propellant substances. The one or more propellant substances may include at least one fuel and at least one oxidiser.

According to another aspect of the present invention, there may also be provided a magnetohydrodynamic (MHD) generator including an inlet to a chamber arranged to receive a plasma having a low particle density which flows along a first axis, the plasma having a low particle density including a plurality of electrons and a plurality of positive ions, means for generating a magnetic field in the chamber having a component which is perpendicular to the first axis, the magnetic field being configured such that, when the plasma having a low particle density is passing through the chamber, the plurality of electrons are deflected from the first axis and the plurality of positive ions are allowed to travel substantially undeflected along the first axis; and one or more electrodes for connecting to a load to generate a current using a charge separation established in the plasma by the magnetic field.

According to another aspect of the present invention, there may also be provided a low earth orbit (LEO) thruster suitable for low earth orbit LEO, the thruster including an inlet to a chamber arranged to receive a plasma having a low particle density when the thruster is moving along a first axis, the plasma having a low particle density including a plurality of electrons and a plurality of positive ions; means for generating a magnetic field in the chamber having a component which is perpendicular to the first axis, the magnetic field being configured such that, when the plasma having a low particle density is passing through the chamber, the plurality of electrons are deflected from the first axis and the plurality of position ions are allowed to travel substantially undeflected along the first axis; and means for generating an electric field to accelerate the plurality of positive ions along the first axis.

Optional features may be part of an MHD generator or may be part of a LEO thruster according to the present invention:

The magnetic field may establish a charge separation when the plasma having a low particle density which passes through the chamber is a substantially ideal plasma having a particle density lower than $10^{20}$ m$^{-3}$.

The magnetic field may deflect the plurality of electrons to travel in a closed drift loop around the first axis.

The perpendicular component of the magnetic field may extend in a radial direction with respect to the first axis. The means for applying a magnetic field may include a plurality of ring magnets arranged in a series of adjacent rings in alignment with the first axis.

The plurality of ring magnets may be arranged so that the polarity of each ring is opposite to the polarity of each adjacent ring in the series.

The one or more electrodes may include a first electrode arranged to collect the plurality of positive ions which are substantially undeflected by the magnetic field.

The first electrode may have a ring shape arranged to lie perpendicular to the first axis.

The first electrode may be connected through the load to a ground connection.

The first electrode may be connected through a load to a second electrode arranged to collect the plurality of electrons which are deflected by the magnetic field. The second electrode may be co-located with the inlet.

The plasma having a low particle density may include one or more ionised propellant substances. The one or more propellant substances may include at least one fuel and at least one oxidiser. The plasma having a low particle density may include ionized aluminium oxide.

The inlet may include an inner nozzle arranged to receive an aluminium fuel supply, and an outer nozzle arranged to provide oxygen for reacting with the aluminium fuel, such that ionized aluminium oxide is propelled from the inlet into the chamber. The aluminium fuel supply may be received in the form of an aluminium wire.

An electrode may collect the plurality of electrons which are deflected by the magnetic field; and a neutraliser may emit the plurality of electrons in along the first axis.

The inlet may collect a plasma having a low particle density through which the thruster is moving. The electric field may be generated by a plurality of multi-aperture grids having a potential difference established between at least two of the grids.

The technique of the present invention allows power to be extracted effectively from plasma having a low particle density by exploiting the non-uniform motion of ions and electrons within the plasma medium.

At low density, the motion of ions and electrons in the plasma is independent, and thus it is possible to generate a high voltage from separation of the ions and electrons. This is not the case for the more dense materials which are conventionally used, in which the primary behaviour is bulk motion of the ions and electrons.

BRIEF DESCRIPTION OF THE DRAWINGS

Embodiments of the present invention will now be described, by way of example, with reference to the accompanying drawings, in which.

DETAILED DESCRIPTION

Figure 1:
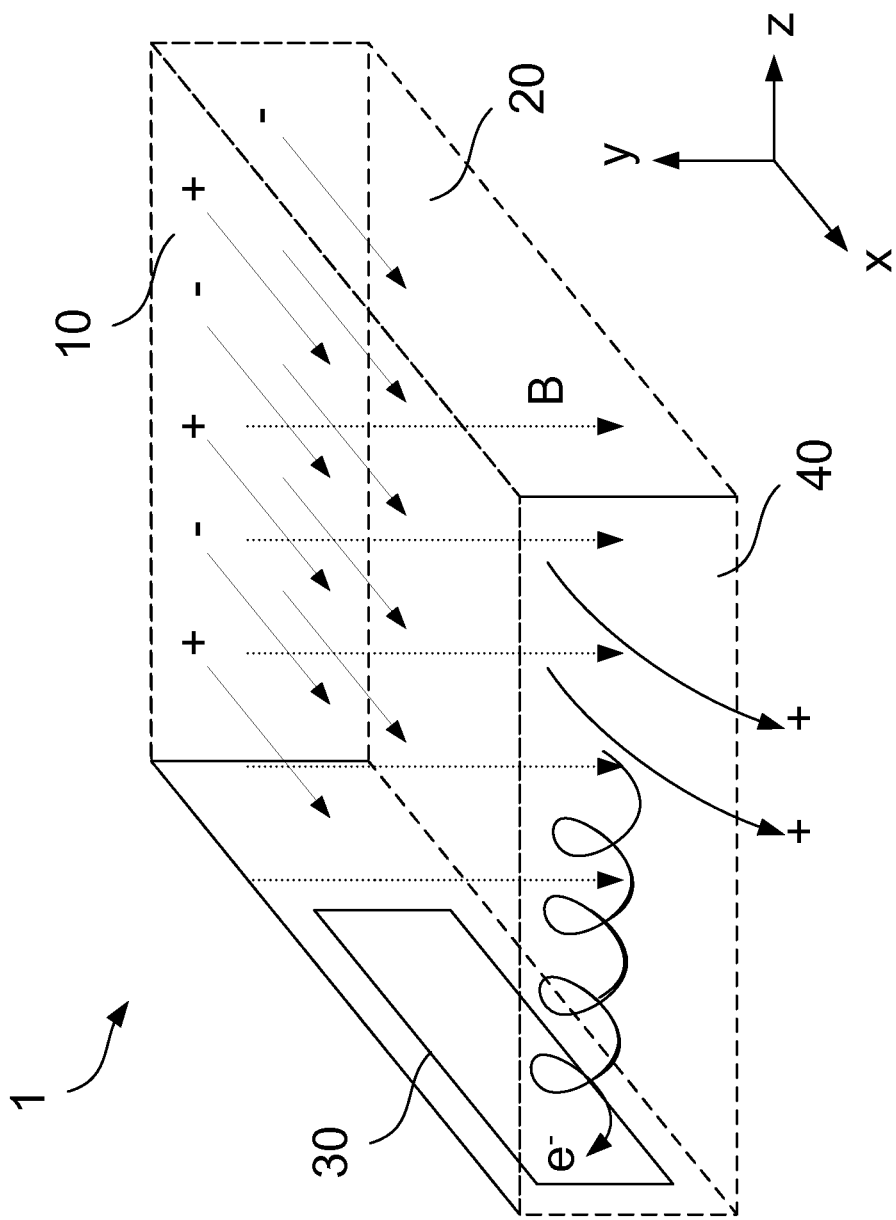
FIG. 1 is a side-elevation view of an MHD generator according to a first embodiment.

With reference to FIG. 1, a magnetohydrodynamic (MHD) generator 1 according to a first embodiment is shown, which comprises an inlet 10 to a chamber 20, means for generating a magnetic field B within the chamber and an electrode 30.

A low density plasma is received through the inlet 10 into the chamber 20 to pass through the magnetic field. The average direction of motion of the plasma defines a first axis (x) of the MHD generator. The motion of individual particles in the plasma is not necessarily parallel to the first axis, but there is an overall flow of the plasma in that direction. At least a component of the magnetic field of the MHD generator is perpendicular to the first axis along which the plasma is propelled. In the embodiment, the magnetic field is parallel and non-divergent along a second axis (y) which is perpendicular to the first axis.

The motion of the low density plasma through the magnetic field causes a Lorentz force to act on the plasma. Specifically the perpendicular component of the magnetic field acts to deflect the plurality of charged particles in the plasma. The Lorentz force acts along a third axis (z) which is perpendicular to each of the first and second axes. Positively charged particles and negatively charged particles are deflected in opposite directions, leading to a separation of charge within the plasma. The neutral particles remaining within the chamber 20 after charge separation has taken effect are ejected from the chamber via an exhaust 40.

The electrode 30 of the MHD generator 1 collects positive or negatively charged particles which are deflected by the magnetic field. The charged electrode 30 may therefore generate a current when connected to ground through a load. Alternatively, dependent on the nature of the plasma a pair of electrodes spaced across the chamber may respectively collect positive and negatively charged particles, such that a current may be generated when the pair of electrodes are connected through a load.

The plasma used in the MHD generator 1 according to the present embodiment is a low density plasma, which means that the overall particle density of the plasma is low. More particularly, the particle density of the plasma is sufficiently low that the mean free time associated with the mean free path of charged particles travelling in a non-uniform manner within the plasma medium is significantly greater than the average interaction time. The plasma parameter of the plasma is large ($\alpha \gg 1$) and electrostatic interactions dominate over two-body collisions. In this low particle density regime, the behaviour of the plasma approaches the theoretical model of a substantially ideal plasma, in which positively charged particles, negatively charged particles and neutral atoms are each modelled as independent ideal gases. The plasma having a low particle density which is used in the present invention may be described as a substantially ideal plasma, insofar as the observed behaviour reflects that of the theoretical model.

For a low particle density plasma comprising positive ions and electrons, the gyroscopic frequency of cyclotron motion of the electrons in a magnetic field is much greater than the collision frequency of the plasma. The electrons of the low density plasma may therefore be deflected by the magnetic field, with minimal scattering. The positive ions, being much more massive than the electrons, are deflected by a relatively small amount from their initial trajectory through the chamber, which leads to a significant charge separation in the low density plasma. The intensity of the magnetic field is configured to allow the average motion of the positive ions to remain substantially in the direction of the first axis with negligible deflection, while the motion of the electrons along the first axis is inhibited.

The electrons of the low density plasma passing through the chamber 20 are deflected by the magnetic field. The initial direction of motion of the plasma through the chamber 20 is substantially along the first axis, and the generated magnetic field acts along the second axis. The Lorentz force on the charged particles of the plasma acts in a direction which is perpendicular to the magnetic field and the direction of motion. The charged particles travelling along the first axis experience a force acting laterally along the second axis.

The non-divergent magnetic field will cause the charged particles to follow a circular path in a plane perpendicular to the magnetic field. The orbit of the circular motion has a radius which is proportional to the particle mass and the particle velocity. As such, an electron orbit will be much smaller than that of a relatively massive positive ion traveling at the same velocity. For the lightest positive ion, which is a proton, the radius of the circular orbit will be approximately 1800 times larger than that of the electron.

As such, the strength of the magnetic field may be selected such that electrons in the incoming plasma are trapped in a circular orbit within the chamber 20, while the positive ions are substantially undeflected over the length of the chamber 20. The frequency of the orbit of the trapped electrons is the gyroscopic frequency or gyrofrequency. As the collision frequency is much smaller than gyrofrequency, the electrons will orbit many times between each scattering event.

The separation of charges within the plasma acts to establish an electric field between the substantially undeflected positively charged particles which continue along the first axis and the negatively charged particles which are impeded from travelling along the first axis. This electric field acts along the first axis in a backwards direction with respect to the initial motion of the plasma. Over time, the motion of the deflected electrons exhibits an overall drift velocity which is dependent upon E×B, where E is the electric field caused by the separation of charge.

The electron motion can be described as a relatively fast cyclotron orbit around a slower moving guiding centre, in which the guiding centre moves at the drift velocity as described above. In the embodiment, therefore, the plurality of electrons drifts to one side of the chamber 20 under the influence of the magnetic field and the established electric field, to be collected by the electrode 30 of the MHD generator 1. The lateral drift of the electrons results in a Hall voltage established along the third axis between the two sides of the chamber. The established Hall voltage is perpendicular to the magnetic field and the electric field established along the first axis. The Hall voltage may be used to drive current through a load e.g. to generate electrical power.

The low particle density of the plasma in the MHD generator 1 of the present embodiment allows substantially independent motion of electrons and ions. The invention provides a greater charge separation using a lower magnetic field intensity, therefore a greater power extraction efficiency can be achieved than if a high density plasma were to be used, in which the collision frequency is greater than the gyroscopic frequency. In a further advantage of the invention, a MHD generator having smaller physical dimensions can also provide a greater power extraction, because the charge separation effect is more strongly influenced by the distribution of the electrons and ions in the plasma itself than the applied magnetic field.

Figure 2:
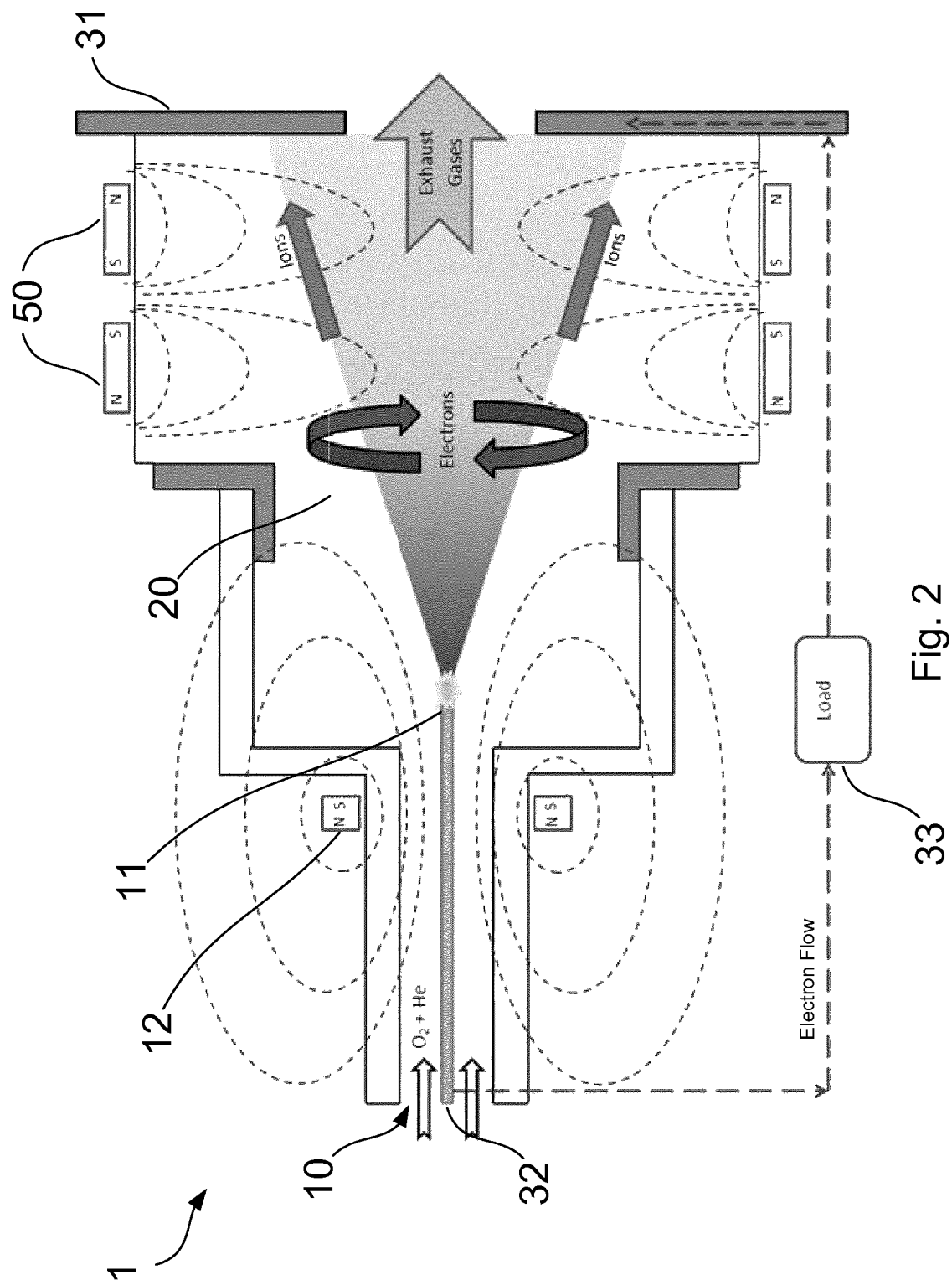
FIG. 2 is a side-elevation view of an MHD generator according to a second embodiment.

FIG. 2 shows an MHD generator 1 according to a second embodiment. Features described with reference to the first embodiment have the same reference signs and further description thereof is omitted for brevity.

The MHD generator 1 of the second embodiment includes a magnetic field which is predominantly radial. The magnetic field is generated by an arrangement of ring magnets 50, each of which is positioned around the chamber 20 in alignment with the first axis. The magnetic arrangement comprises a series of ring magnets 50 having opposing orientations in adjacent rings. According to the embodiment, the magnetic field is generated by two ring magnets 50 having opposing orientations, thereby forming a region in which two like poles oppose each other. The magnetic arrangement of the embodiment has a series of poles having north, south, south and north polarities in an order seen along the first axis of the MHD generator 1. In some embodiments, the magnetic field may be generated by permanent ring magnets, or by ring-shaped electromagnets or superconducting magnets. The region where the south poles oppose each other is referred to as a "cusp" of the magnetic field shape, and thus the overall field profile is described as a "radial cusped field". It is understood that that magnetic polarities may be reversed with no loss of generality.

The magnetic field generated by this arrangement exhibits a substantially radial field pattern in a plane aligned with each ring of magnetic poles. For example, in the plane at which the two ring magnets 50 abut with opposing south poles, a field pointing radially outwards increases with increasing radial distance from a central null region. In the plane of each ring of north poles, a field pointing radially inwards will increase with increasing radial distance from a central null region. In the region between each ring of magnetic poles, the field extends substantially parallel to the first axis of the MHD generator 1.

As the positive and negatively charged particles of the plasma pass through the magnetic field, the radially extending component of the magnetic field is perpendicular to the axial component of the particle motion and exerts a Lorentz force on each of the charged particles. The Lorentz force acts in a direction which is perpendicular to each of the direction of motion and the direction of the magnetic field. The magnetic field pointing radially inwards therefore operates to deflect the positive and negatively charged particles in anticlockwise and clockwise directions respectively with respect to the direction of motion.

The magnetic field will cause the charged particles to follow a substantially circular path in a plane perpendicular to the magnetic field. The path is not exactly circular due to the divergence of the magnetic field. The orbit of the circular motion has a radius which is proportional to the particle mass and the particle velocity. As such, an electron orbit will be much smaller than that of a relatively massive positive ion traveling at the same velocity. The radius of an electron orbit will be smaller than that of a positive ion by at least a factor of 1000.

In a plasma with a low particle density, the motions of positive and negatively charged particles are substantially independent of one another as described above. According to the embodiment, a low density plasma comprising a mixture of aluminium and oxygen is propelled through the inlet 10 in the direction of the first axis. The initial trajectory of individual particles may include a small angular spread with respect to the overall flow of the plasma along the first axis. The low density plasma comprises positive ions and electrons.

As such, the strength of the magnetic field may be selected such that electrons in the incoming plasma are trapped in a circular orbit within the chamber 20, while the positive ions are substantially undeflected over the length of the chamber 20. The electrons are trapped in the cusp region of the magnetic field. The frequency of the orbit of the trapped electrons is called the gyrofrequency or cyclotron frequency.

The initial separation of charges within the plasma acts to establish an electric field between the substantially undeflected positively charged particles which continue along the first axis and the negatively charged particles which are impeded from travelling along the first axis. This electric field acts along the first axis in a backwards direction with respect to the initial motion of the plasma.

The established electric field is substantially parallel to the first axis. The electric field is directed from the downstream end of the chamber 20 towards the inlet 10. The electric field acts in a direction which is perpendicular to the magnetic field in the cusp region where the magnetic field is substantially radial. The electric field and the perpendicular magnetic field cause an azimuthal Hall current to flow through the plasma in the chamber 20. The electrons trapped in the cusp region of the magnetic field are caused to drift in a direction which is perpendicular to the magnetic field and the established electric field. The electrons continue to orbit around a guiding centre which moves in the direction of drift. The guiding centre of the electrons drifts in an azimuthal direction, clockwise or anticlockwise around the first axis of the chamber. In this way, the electrons are deflected to enter a closed drift loop around the first axis of the chamber 20.

The plurality of trapped electrons are caused to circulate in a Hall current around the first axis. The Hall current circulating through the plasma causes Joule heating of the plasma. The conductive plasma resists the flow of electrons and heat is generated as a result. Kinetic energy of the electrons is transferred to heat energy in the plasma. The heating of the low density plasma increases the energy of the particles which make up the plasma, including the neutral particles.

The trapped electrons can collide with neutral particles in the plasma passing through the chamber 20. A collision with a neutral particle can knock an electron free, ionising the particle. A proportion of the neutral particles in the plasma are ionised by the trapped electrons in this way. The ionisation percentage of the incoming plasma is increased as it passes through the chamber. The ionisation percentage of the low density plasma at the downstream end is higher than at the inlet.

The neutral particles are more easily ionised with the temperature of the plasma is raised. The heating of the plasma therefore increases the rate of ionisation as the plasma flows through the closed drift loop of electrons. In addition, the electrons released by the ionisation of neutral particles are also trapped in the closed drift loop by the magnetic cusp. The ionisation rate can therefore be improved over time as more electrons are captured in the Hall current.

The increasing ionisation percentage over time leads to a greater number of positive ions at the downstream end of the chamber 20. As such, the strength of the electric field generated by the separation of charge will increase over time. A substantial axial electric field can be established with no initial field generated. The geometry of the magnetic field in the embodiment allows separation of the electrons and positive ions with a lower intensity magnetic field. The power extraction efficiency of the MHD generator 1 is therefore increased.

A first electrode 31 is an annular electrode arranged in a plane perpendicular to the first axis of the MHD generator 1 and positioned downstream of the plurality of ring magnets 50, with respect to the motion of the plasma. The first electrode 31 is arranged to intercept the plurality of positive ions which pass substantially undeflected through the magnetic field. The positive ions collect a plurality of electrons from the first electrode 31 when intercepted by the electrode.

A second electrode 32 is positioned upstream of the plasma inlet 10 and connected to the first electrode 31 through a load 33. The second electrode 32 collects a plurality of electrons which have been deflected into the closed drift loop or otherwise repelled from entering the chamber 20 due to the concentration of negative charge. The charge separation in the MHD generator 1 therefore causes a flow of electrons from the second electrode 32 to the first electrode 31, such that a current is driven through the load 33. In some embodiments, the first electrode 31 may be connected to earth through the load 33.

The inlet 10 through which the plasma is received comprises a nozzle 11 for propelling the low density plasma through the chamber 20. The low density plasma is ejected from the nozzle 11 in a narrow cone which is centred on the first axis. The nozzle 11 forms the second electrode 32 or, alternatively, is co-located with the second electrode 32. The nozzle 11 is fitted with a stabilisation magnet 12, which acts so as to stabilise the plasma flow, for example, close to the central longitudinal axis of the chamber 20. The stabilisation magnet 12 is formed as a ring magnet in this embodiment, and the field has a shape running parallel to the first axis along the central region of the nozzle 11, which stabilises the plasma, as shown in FIG. 2.

In other embodiments, the MHD generator 1 of the present invention may include three or more ring magnets arranged in a series with adjacent ring magnets having opposing orientations. An embodiment having three ring magnets has a series of poles having north, south, south, north, north and south polarities, thus forming a first magnetic cusp when the south poles oppose each other and a second magnetic cusp where the north poles oppose each other. By providing a plurality of successive magnetic cusps, embodiments of the invention can provide an improved charge separation which leads to further improvements in power generation efficiency.

An alternative arrangement of one or more magnets may be used to implement the present inventive concept, provided that at least a component of the generated magnetic field is perpendicular to the direction of motion of the plasma. The deflection of electrons by the magnetic field can establish an electric field in a direction which is antiparallel to the direction of motion of the plasma. A Hall voltage can be established in a direction which is perpendicular to both the generated magnetic field and the established electric field. Embodiments of the invention are configured to generate a magnetic field with a radial geometry such that the Hall voltage forms a closed drift loop of electrons.

The magnetic field of an MHD generator 1 according to an embodiment may be generated by an arrangement of two or more cylindrical bar magnets, each of which is positing centrally in the chamber in alignment with the first axis. The magnetic arrangement may comprise two cylindrical bar magnets having opposing orientations, so as to form a magnetic cusp in a region where two like poles oppose each other. A substantially radial magnetic field is generated in the region between the two magnets, the field pointing radially outwards between two opposing north poles or radially inwards between two opposing south poles.

Alternatively, the ring magnet embodiment described with respect to FIG. 2 above may be combined with a central arrangement comprising cylindrical bar magnets or, alternatively, a series of ring magnets having a smaller diameter. The magnetic arrangement of the embodiment therefore defines an annular chamber surrounding the first axis and aligned therewith. The central arrangement of magnets is configured to have the opposite polarities to the outer ring magnets. For example, an arrangement of ring magnets forming a series of poles having north, south, south and north polarities is combined with a central arrangement of south, north, north and south poles, or vice versa.

A substantially radial magnetic field is generated in the plane at which the two adjacent sets of magnets abut with each other, where the field may point radially outwards from a central pair of north poles to an outer pair of south poles, or otherwise point radially inwards from a pair of outer north poles to an inner pair of south poles.

In a further embodiment, a closed drift loop may be formed by a magnetic field which extends in parallel to an axis of the MHD generator 1, where at least a component of the velocity of the low density plasma extends radially with respect to said axis. The electric field E established by the separation of charge has a radial component in this case, such that the Hall voltage, which depends upon E×B, forms a closed drift loop of electrons around the axis. Such an embodiment will be described in more detail with respect to FIG. 4 below.

Figure 3:
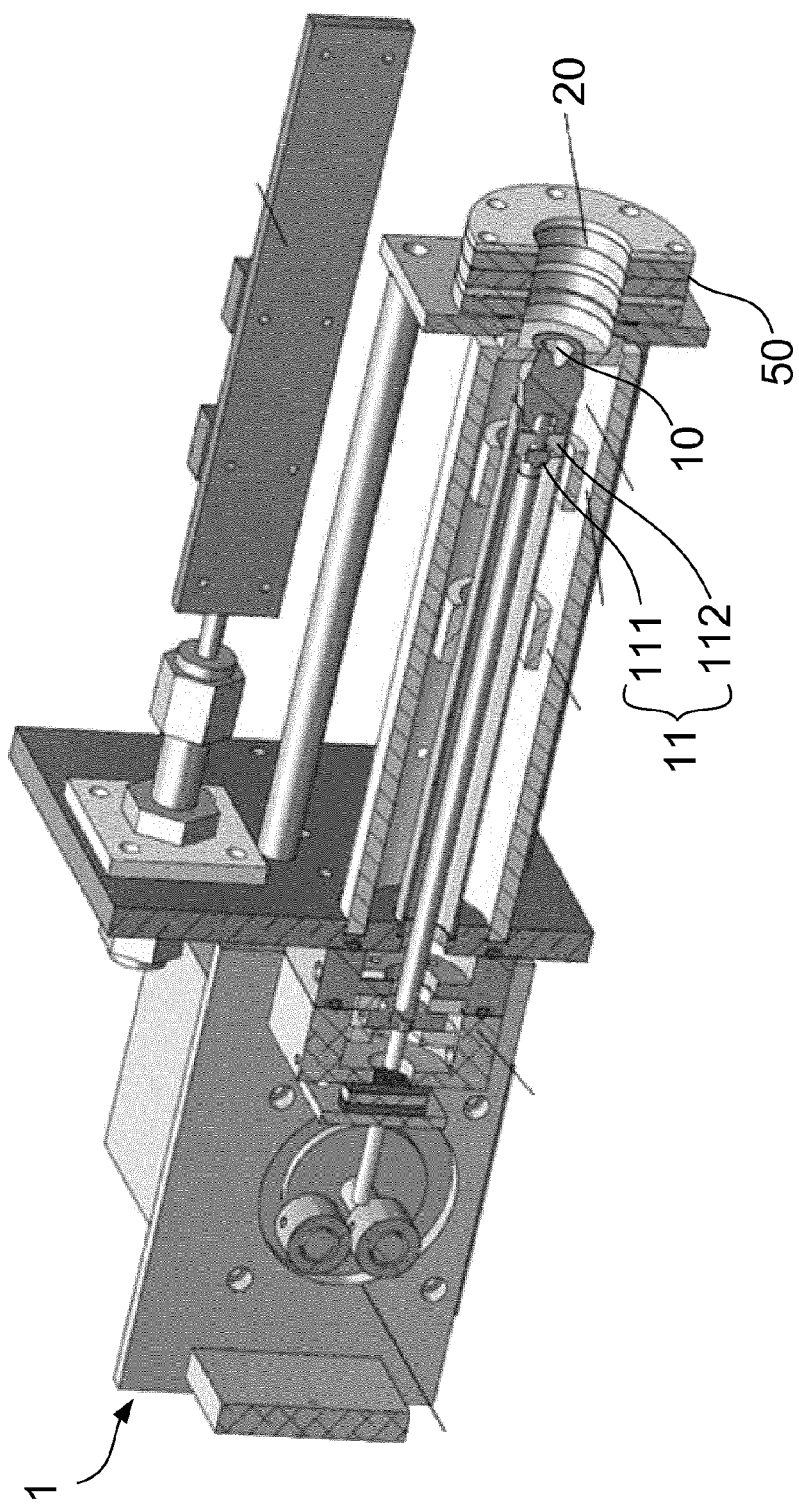
FIG. 3 is a perspective view of the MHD generator of the second embodiment.

FIG. 3 shows the MHD generator 1 of the second embodiment in a lab-scale implementation. The following dimensions are order of magnitude values only.

The MHD generator 1 comprises a chamber 20 defined by the nozzle 11 and first electrode 31 at respective ends and bound by the plurality of ring magnets 50. The chamber 20 of the MHD generator 1 is 1 m long and has a radius of 0.1 m.

An aluminium oxide plasma having a low particle density is formed by heating an aluminium wire which is fed through an inner part in of the nozzle 11, by means of an electric arc. Oxygen gas is passed through an outer part 112 of the nozzle and reacts exothermically with the aluminium wire to form the aluminium oxide plasma, which is propelled at a high velocity in a narrow cone from the nozzle 11 along the first axis through the chamber 20.

In some embodiments, the low density aluminium plasma may be generated by alternate means. An aluminium fuel supply may provide aluminium in a pure form, or as part of an alloy or compound, which may be subjected to heat and/or a chemical reaction in order to generate the low density aluminium plasma.

The low density plasma propelled through the chamber 20 has a particle velocity of 10 km/s at the inlet 10, although the velocity is reduced in the body of the chamber 20 by the extraction of kinetic energy. A low density plasma has a low particle density which is typically $10^{20}$ m$^{-3}$ or less. In an embodiment, the particle density is $10^{20}$ m$^{-3}$. A small percentage of the plasma may be ionised, for example the incoming plasma may be 1% ionised. The charged particle density is therefore $10^{18}$ m$^{-3}$.

The peak magnetic field strength is 100 Gauss ($10^{-2}$ T). The strength of the magnetic field is sufficient to deflect the electrons of the plasma while allowing the positive ions to flow substantially undeflected through the chamber 20. The deflection of electrons causes a spatial separation of the electrons and positive ions along the first axis.

When designing the MHD generators 1 of the embodiments described above, the Debye length of the plasma is taken into account in order to determine the size of the chamber. The Debye length is the range over which electrostatic effects will persist, and so is controlled to be great enough to enable charge separation effects to occur. The Debye length is controlled by choosing an appropriate plasma pressure. To increase the Debye length, the electron density is decreased and temperature is increased.

In the embodiments described above, the exhaust gases comprise a low pressure, weakly ionised beam.

The power generated by the MHD generator 1 of the embodiment may be directed to the arc nozzle 11 to electrically heat the aluminium wire for generating the low-density plasma. With improved efficiency, the power recovered from the chemical reaction between the aluminium and oxygen by the MHD generator 1 may be sufficient to meet the power demands of the arc-nozzle 11, such that the MHD generator 1 can be operated as a self-sustaining plasma source. Once initiated, the self-sustaining plasma source will output a weakly ionised exhaust beam as long as a supply of aluminium fuel is provided.

Use can be made of the exhaust gases for a number of applications. For example, the exhaust gases can be used in physical vapour deposition (PVD) processes, where it is desired to deposit a thin film of material corresponding to the plasma. An example is an aluminium oxide coating deposited from aluminium oxide plasma. A PVD system can therefore be designed which contains the additional benefit of power generation, a feasible embodiment due to the relatively small size of the MHD generator 1.

Other applications are in light and display technology, where the exhausted plasma may be sufficiently ionised to find use in plasma cells. The MHD generator 1 may be modified such that the closed drift loop of electrons is located within a resonant chamber, thus providing a magnetron-type oscillator for generating microwaves.

Where it is not desired to couple the MHD generator 1 of the invention to a separate system employing the exhaust gases, the gases can be recycled through the generator for further charge separation, until the momentum of the charged particles is too low to usefully recover any remaining energy.

In an embodiment of the invention, a thermal recovery mechanism is coupled to the MHD generator 1, to generate power using excess heat from the plasma generation process. Heat emission can significantly reduce the efficiency of the MHD generator 1. The thermal recovery mechanism recovers a portion of the energy lost through heat emission and provides the energy to the arc nozzle 11. The combination of the MHD generator 1 with a thermal recovery mechanism can therefore exhibit a high enough efficiency to provide a self-sustaining plasma source, as described above.

The embodiments of the present invention can be interpreted as a form of fuel cell. For simplicity of explanation, consider a conventional fuel cell in which a fuel such as hydrogen is oxidised using oxygen, and electrical potential is generated.

The fuel cell contains three zones—an anode, a cathode, and a proton exchange membrane separating the two. The fuel cell operates by oxidising the hydrogen at the anode of the cell. The oxidation is performed by a catalyst, typically platinum, embedded into the membrane. The membrane is a substance specifically designed so that ions can pass through it, but electrons cannot.

The oxidation of the hydrogen generates positively charged hydrogen ions, which pass through the membrane and travel towards the cathode, whereas the electrons lost from the hydrogen are trapped by the membrane for conduction through an external circuit, generating a current.

At the cathode, oxygen combines with the hydrogen ions, and electrons from the external circuit to form water as an exhaust product. The external circuit is thus completed.

The proton exchange membrane is the most complex and expensive component of the fuel cell due to the requirement that it blocks electrons and permits positive ions to pass through it.

Figure 4:
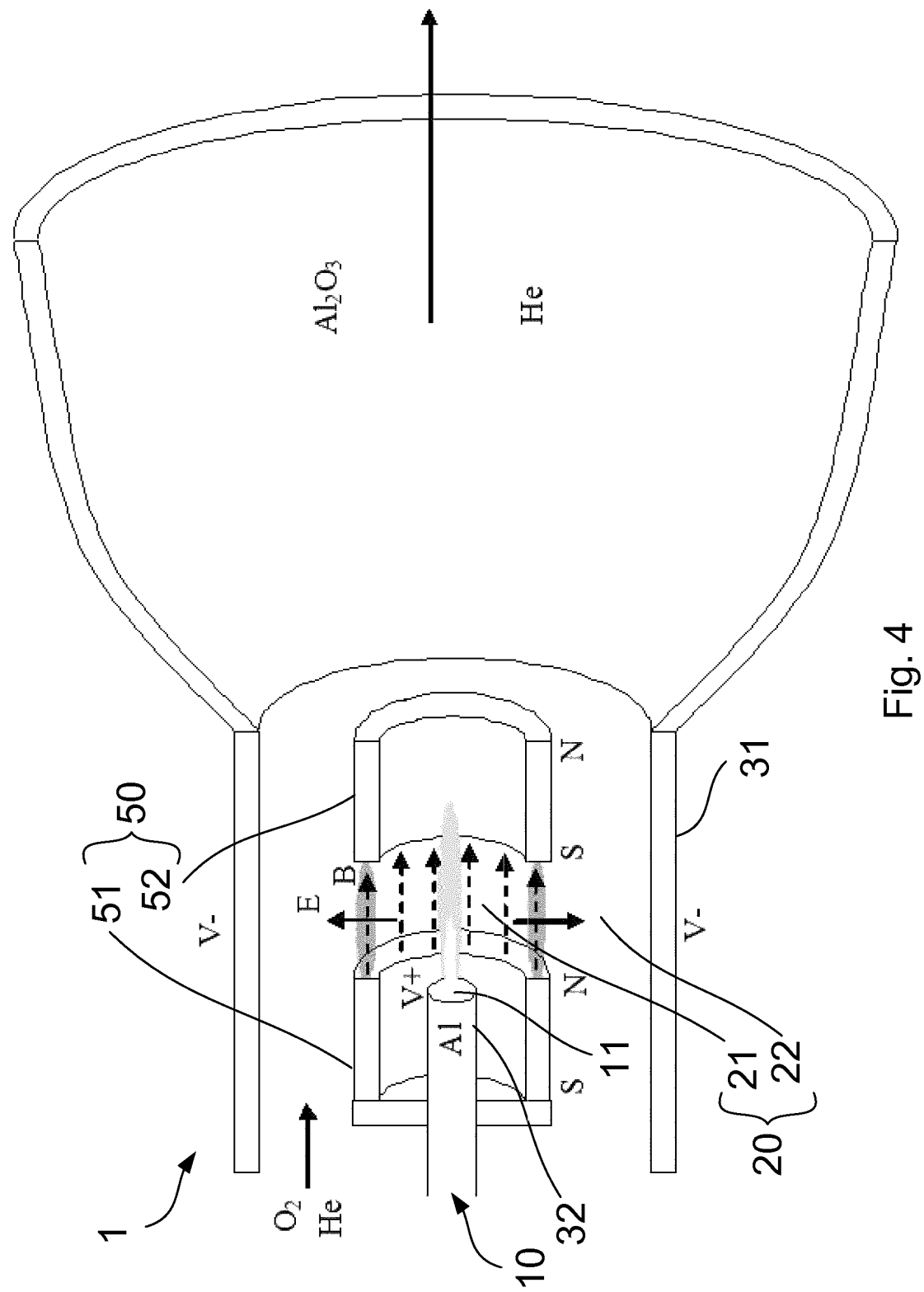
FIG. 4 is a side-elevation view of an MHD generator according to a third embodiment.

FIG. 4 shows a third embodiment of the present invention which can be characterised as a fuel cell in which the membrane is removed, and replaced by the charge separation mechanism described previously. This replacement would effectively reduce the complexity and cost of the fuel cell.

In the embodiment, a low density aluminium plasma comprising electrons and positive aluminium ions is propelled through the nozzle 11 into an inner region 21 of the chamber 20. A magnetic field is generated by a pair of ring magnets 50 arranged to have the same orientation, thereby forming successive sets of poles having south, north, south and north in an order seen along the first axis of the apparatus.

The magnetic field generated by this arrangement generates an axial field which is strongest in an annular region extending directly between the pair of ring magnets 50. As the electrons and positive ions of the plasma spread outwards from the nozzle 11 in a narrow cone, the radial component of the particle motion is perpendicular to the axial field and a Lorentz force is exerted on each of the charged particles.

The magnetic field pointing along the first axis from the north pole of the first ring magnet 51 to the south pole of the second ring magnet 52 therefore operates to deflect the positive ions and electrons in anticlockwise and clockwise directions respectively with respect to the first axis. The intensity of the magnetic field is selected such that the electrons are deflected into a closed drift loop and the positive ions continue substantially undisturbed into an outer region 22 of the chamber 20.

The separation of charges within the plasma acts to establish an electric field in a radially inwards direction from the outer region 22 containing undeflected positive ions to the inner region 21 containing deflected electrons. The plurality of electrons therefore drifts in a clockwise direction with respect to the first axis, under the influence of the magnetic field parallel to the first axis and the radially inward electric field established by the charge separation. The motion of the electrons can be described as a fast cyclotron orbit around the drift vector which extends in a clockwise direction.

An annular first electrode 31 is located around the outer region of the chamber and is connected through a load to a second electrode 32 which is formed by, or otherwise co-located with, the nozzle 11 in the inner region of the chamber. The closed drift loop of electrons establishes a charge separation between the inner chamber 21 and the outer chamber 22. The radial electric field which is generated drives a flow of electrons from the second electrode 32 to the first electrode 31. Oxygen gas is propelled through the outer region 22 of the chamber 20, such that positive aluminium ions in the outer chamber combine with oxygen atoms and collect electrons from the first electrode 31 to form neutral $Al_2O_3$.

A current can therefore be driven from the first electrode 31 to the second electrode 32, through the load to generate power. The apparatus can be characterised as a power generating fuel cell in which the proton exchange membrane is replaced by a magnetic field.

It will be appreciated that the fuel cell analogy is valid where the input fluid is any suitable fuel/oxidiser combination, but the analogy can be extended to cover the provision of multiple reactants in general terms which react exothermically (i.e. the reaction is energetically favourable). The multiple reactants can be two or more reactants. In an alternative embodiment, a mono-propellant such as hydrazine ($N_2H_4$) can be used. Hydrazine is thermodynamically unstable, and can thus be decomposed over a catalyst at low pressure to generate positive H+ ions and electrons, which form the basis of the charge separation.

In some embodiments, an ambient low density plasma may be propelled through the chamber 20 by motion of the apparatus through the low density plasma. The inlet 10 can therefore collect an ambient low density plasma such as, for example, a rarefied interstellar plasma or an atmospheric plasma as is typically found in the ionosphere.

Figure 5:
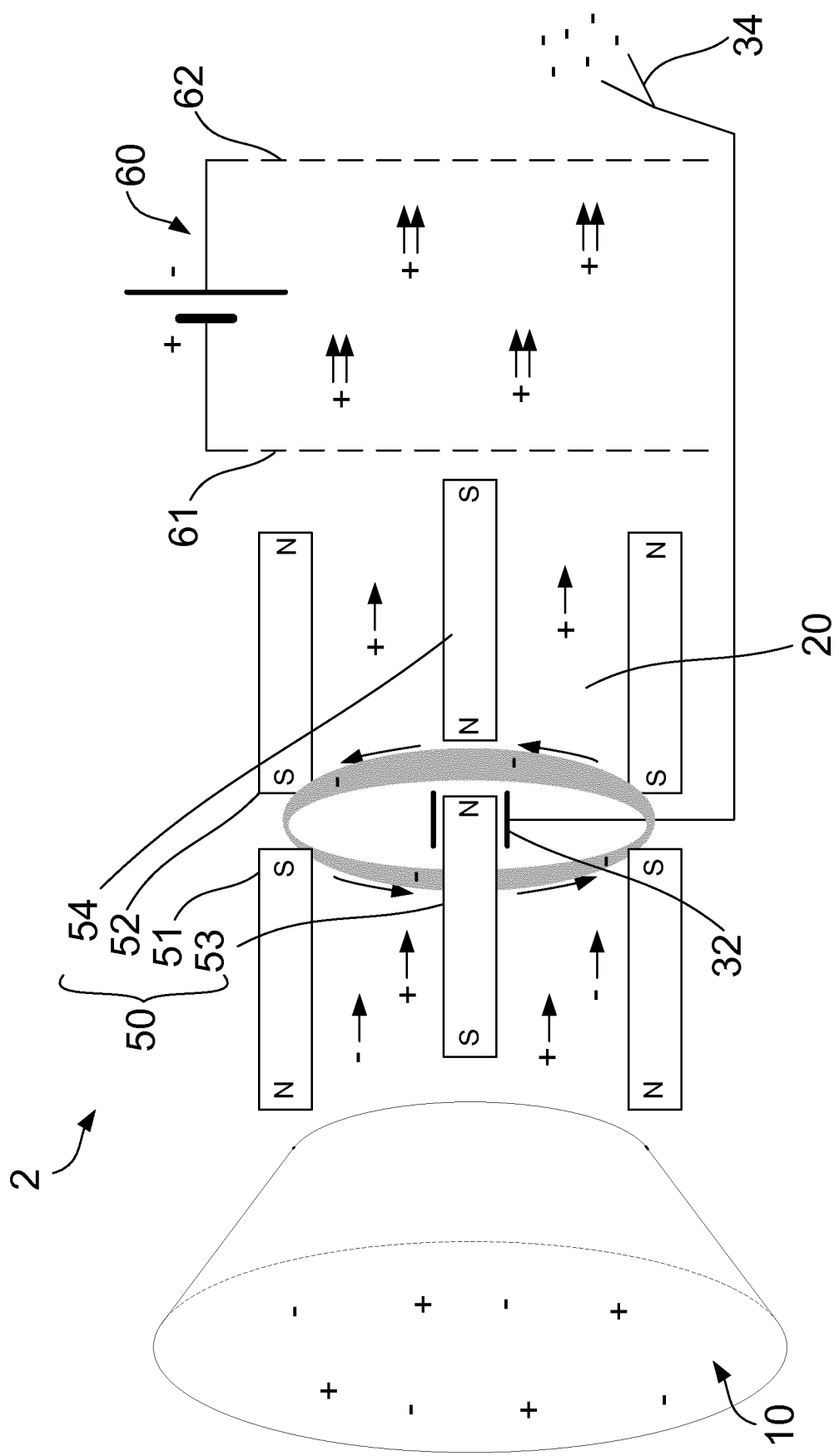
FIG. 5 is a LEO thruster according to a fourth embodiment.

With reference to FIG. 5, a fourth embodiment of a Low-Earth Orbit (LEO) thruster 2 implementing the charge separation mechanism of the present invention is shown, which comprises an inlet 10 to a chamber 20, means for generating a magnetic field within the chamber, an electrode 32 connected with a neutraliser 34, and a grid ion thruster 60.

The inlet 10 of the LEO thruster 2 is formed as a wide opening to collect an ambient low pressure plasma which is incident due to motion of the LEO thruster 2 through the ambient plasma. The inlet 10 and chamber 20 are centred on a first axis which is aligned with the direction of motion of the LEO thruster 2. The low pressure plasma passes through the chamber 20 along the first axis due to the relative motion between the thruster 2 and the ambient plasma. From the frame of reference of the thruster 2, the low density plasma flows into the inlet 10 and through the chamber 20 along the first axis.

The magnetic field within the chamber 20 is generated by an arrangement of outer ring magnets 51,52 and central bar magnets 53,54, as has been described above. Any of the means for generating a magnetic field described hereinbefore may be implemented in embodiments of the LEO thruster 2.

The grid ion thruster 60 comprises a pair of multi-aperture grids 61,62, each arranged in a plane perpendicular to the first axis and positioned downstream of the chamber 20, with respect to the relative motion of the plasma through the LEO thruster 2. A potential difference is established between the two grids 61,62 such that the a first "screen" grid 61 out of the pair is positively charged, and a second "accelerator" grid 62 out of the pair is negatively charged. The grid ion thruster 60 is arranged so that relative motion causes the low density plasma to pass through the screen grid 61 followed by the accelerator grid 62.

The electrode 32 is located centrally within the chamber and is connected to the neutraliser 34 which is located downstream of the grid ion thruster 60. The neutralizer 34 is a cathode configured to emit a plurality of electrons from the rear of the LEO thruster 2.

The LEO thruster 2 of the fourth embodiment provides means for propelling a vehicle moving in a low-earth orbit (LEO vehicle). An LEO vehicle moves through the upper atmosphere, specifically the thermosphere or exosphere, and experiences a small amount of atmospheric drag as a result. The LEO vehicle thus requires propulsion to maintain a stable low earth orbit.

The upper thermosphere and lower exosphere together form the ionosphere at an altitude between about 85 km and 600 km, a region in which the atmosphere is at least partially ionized by solar radiation. The ionosphere has a particle density between about $10^{10}$ m$^{-3}$ and $10^{15}$ m$^{-3}$ and can be up to about 1% ionized by ultraviolet solar radiation, which causes ionization primarily of NO at lower altitudes and $O_2$ at higher altitudes. The ionosphere is therefore a plasma having a low particle density. The ionospheric plasma comprises a plurality of electrons and a plurality of positive ions such as O+ and NO+. Similar atmospheric conditions may be found in the atmosphere of another planet such as, for example, Mars or Venus, and embodiments of the present invention may be suitable for any atmosphere which exhibits such conditions.

The electrons of the low density plasma passing through the chamber 20 are deflected by the magnetic field. In the region at which the like poles of the pair of ring magnets 51,52 and the pair of bar magnets 53,54 respectively are in opposition with each other, as described above, the magnetic field is substantially radial. The initial direction of motion of the plasma through the chamber 20 is substantially along the first axis. The Lorentz force on the charged particles of the plasma acts in a direction which is perpendicular to the magnetic field and the direction of motion. The charged particles travelling along the first axis experience a force acting azimuthally in a clockwise or anticlockwise direction.

The magnetic field will cause the charged particles to follow a substantially circular path in a plane perpendicular to the magnetic field. The path is not exactly circular due to the divergence of the magnetic field. The orbit of the circular motion has a radius which is proportional to the particle mass and the particle velocity. As such, an electron orbit will be much smaller than that of a relatively massive positive ion traveling at the same velocity. The radius of an electron orbit will be smaller than that of a positive ion by at least a factor of 1000.

As such, the strength of the magnetic field may be selected such that electrons in the incoming plasma are trapped in a circular orbit within the chamber 20, while the positive ions are substantially undeflected over the length of the chamber 20. The electrons are trapped in the cusp region of the magnetic field. The frequency of the orbit of the trapped electrons is called the gyrofrequency or cyclotron frequency.

The deflection of electrons establishes a charge separation along the first axis of the chamber 20. The plasma which flows in the downstream end of the chamber 20 has a higher proportion of positive ions. The downstream end of the chamber 20 gains an overall positive charge with respect to the upstream end. An electric field is established by the separation of charges in the chamber 20.

The established electric field is substantially parallel to the first axis. The electric field is directed from the downstream end of the chamber 20 towards the inlet 10. The electric field acts in a direction which is perpendicular to the magnetic field in the cusp region where the magnetic field is substantially radial. The electric field and the perpendicular magnetic field cause an azimuthal Hall current to flow through the plasma in the chamber 20. The electrons trapped in the cusp region of the magnetic field are caused to drift in a direction which is perpendicular to the magnetic field and the established electric field. The electrons continue to orbit around a guiding centre which moves in the direction of drift. The guiding centre of the electrons drifts in an azimuthal direction, clockwise or anticlockwise around the first axis of the chamber. In this way, the electrons are deflected to enter a closed drift loop around the first axis of the chamber 20.

The plurality of trapped electrons are caused to circulate in a Hall current around the first axis. The Hall current circulating through the plasma causes Joule heating of the plasma. The conductive plasma resists the flow of electrons and heat is generated as a result. Kinetic energy of the electrons is transferred to heat energy in the plasma. The heating of the low density plasma increases the energy of the particles which make up the plasma, including the neutral particles.

The trapped electrons can collide with neutral particles in the plasma passing through the chamber 20. A collision with a neutral particle can knock an electron free, ionising the particle. A proportion of the neutral particles in the plasma are ionised by the trapped electrons in this way. The ionisation percentage of the incoming plasma is increased as it passes through the chamber. The ionisation percentage of the low density plasma at the downstream end is higher than at the inlet.

The neutral particles are more easily ionised with the temperature of the plasma is raised. The heating of the plasma therefore increases the rate of ionisation as the plasma flows through the closed drift loop of electrons. In addition, the electrons released by the ionisation of neutral particles are also trapped in the closed drift loop by the magnetic cusp. The ionisation rate can therefore be improved over time as more electrons are captured in the Hall current.

The increasing ionisation percentage over time leads to a greater number of positive ions at the downstream end of the chamber 20. As such, the strength of the electric field generated by the separation of charge will increase over time. A substantial axial electric field can be established with no initial field generated.

The electric field established in the chamber 20 acts against the flow of positive ions. The electric field therefore acts against the motion of the LEO thruster 2 through the ambient plasma. The electric field acts to reduce the kinetic energy of the LEO thruster 2 and generates heat energy in the low density plasma within the chamber 20. This generated heat energy causes increased ionisation of the plasma through collisions with the electrons trapped in the magnetic cusp. The flow of low density plasma moving from the chamber 20 and through the grid ion thruster 60 therefore has a higher number of positive ions, which pass substantially undeflected through the chamber 20.

The potential difference between the screen grid 61 and the accelerator grid 62 generates a uniform electric field directed from the screen grid 61 to the accelerator grid 62, in parallel with the first axis of the LEO thruster 2. The plurality of positive ions which pass through the screen grid 61 are accelerated by the electric field before passing through the accelerator grid 62. The acceleration of the plurality of positive ions exerts a reciprocal force to propel the LEO thruster 2.

The LEO thruster 2 of the present invention can be accelerated more effectively by the grid ion thruster 60 due to the high number of positive ions which exit the chamber 20. The motion of the LEO thruster 2 through the ambient plasma generates heat within the chamber 20, which increases the ionisation rate of the plasma which flows through the chamber 20. The increased ionisation rate results in a greater number of positive ions passing through the grid ion thruster 60, improving the acceleration of the LEO thruster 2.

The electrode 32 collects a plurality of electrons which have been deflected into the closed drift loop or otherwise repelled from entering the chamber 20 due to the concentration of negative charge. The charge separation in the chamber 20 of the LEO thruster 2 drives a flow of electrons to the neutraliser 34, where the electrons are emitted from the rear of the thruster 2. The emitted electrons mix with the low energy plasma which is propelled out of the LEO thruster 2, and restore the equal proportions of electrons and positive ions.

The invention according to the present embodiment provides a LEO thruster 2 which can maintain a LEO vehicle in orbit using a purely electric form of propulsion. More particularly, the LEO thruster 2 of the present invention can be described as an "air breathing" form of propulsion, in which electrical energy is used to impart additional kinetic energy directly to the air flow passing through the LEO thruster 2. The charge separation mechanism in the low energy plasma allows a predominately positively charged flow of plasma to be accelerated with a uniform electric field.

The magnetic field configuration of the LEO thruster 2 allows the charge separation mechanism to be effective with a wide range of external conditions. The radial cusp geometry of the magnetic field can deflect and trap incoming electrons having a wide of range of initial speeds and directions of motion, in comparison with a uniform magnetic field of a similar strength. The magnetic field is also robust to perturbations which act to dislodge the electrons trapped by the field e.g. collisions between trapped electrons.

In an alternative embodiment, the grid ion thruster 60 may include three or more grid, or a series of paired grids similar to the pair of grids 61,62 described above. Alternative, other means of generating an electric field for accelerating the plurality of positive ions may be implemented.

Although a few embodiments of the present invention have been shown and described, it will be appreciated by those skilled in the art that changes may be made in these embodiments without departing from the invention, the scope of which is defined in the appended claims. Various components of different embodiments may be combined where the principles underlying the embodiments are compatible. For example, various magnetic field profiles may be applied for various different plasma types and electrode configurations, where suitable charge separation effects can be achieved. A desired charge separation effect may be dependent upon the size of the voltage required to be generated or the amount or type of plasma available, for example.

The invention claimed is:

1. A method of magnetohydrodynamic power generation, the method comprising:
   producing a charge separation in a plasma which comprises a plurality of electrons and a plurality of positive ions by:
   providing the plasma through an inlet to a chamber arranged to receive the plasma;
   generating a magnetic field in the chamber;
   passing the plasma along a first axis through the magnetic field, wherein the magnetic field is formed by a plurality of ring magnets which are arranged adjacent and in series so as to form a series of adjacent ring magnets in alignment with the first axis, and the plurality of ring magnets are arranged so that a polarity of each ring magnet of the plurality of ring magnets is opposite to a polarity of each adjacent ring magnet of the plurality of ring magnets in the series of adjacent ring magnets, wherein the magnetic field is generated having a component which is perpendicular to the first axis,
   wherein an electron gyroscopic frequency of the plasma is larger than a particle collision frequency of the plasma, such that the magnetic field is configured so as to separate the plurality of electrons radially from the first axis, and to allow the plurality of positive ions to travel along the first axis thereby generating separated electrons and separated positive ions;
   arranging an electrode to collect the separated positive ions; and
   connecting a load between the electrode and one of either a ground or another electrode arranged to collect the separate electrons thereby generating a current.

2. The method according to claim 1, wherein the plasma the is an ideal plasma in which the plurality of positive ions and the plurality of electrons move substantially independently of one another.

3. The method according to claim 1, wherein a particle density of the plasma is lower than $10^{20}$ m$^{-3}$.

4. The method according to claim 1, wherein the magnetic field is configured so as to deflect the plurality of electrons to travel in a closed drift loop around the first axis.

5. The method according to claim 1, wherein the component of the magnetic field extends in a radial direction with respect to the first axis.

6. The method according to claim 1, further comprising generating the plasma from at least one fuel and at least one oxidizer.

7. A magnetohydrodynamic generator, comprising:
   an inlet to a chamber arranged to receive a plasma, which flows along a first axis, the plasma comprising a plurality of electrons and a plurality of positive ions;
   a plurality of ring magnets for generating a magnetic field in the chamber having a component that is perpendicular to the first axis, wherein the plurality of ring magnets are arranged adjacent and in series so as to form a series of adjacent ring magnets in alignment with the first axis so that a polarity of each ring magnet of the plurality of ring magnets is opposite to a polarity of each adjacent ring magnet of the plurality of ring magnets in the series of adjacent ring magnets, wherein an electron gyroscopic frequency of the plasma is larger than a particle collision frequency of the low density plasma, such that, the magnetic field is configured, when the plasma is passing through the chamber, the plurality of electrons are separated radially from the first axis and the plurality of positive ions are allowed to travel along the first axis thereby generating separated electrons and separated positive ions;
   an electrode arranged to collect the separated positive ions, so that the electrode is thereby configured to generate a current when a load is connected between the electrode and one of either a ground or another electrode arranged to collect the separate electrons.

8. A Low Earth Orbit (LEO) thruster suitable for LEO, the LEO thruster comprising:
- an inlet configured to collect a portion of plasma from an ambient plasma through which the thruster is moving and to provide said portion of plasma to a chamber arranged to receive said portion of plasma when the thruster is moving along a first axis, the portion of plasma comprising a plurality of electrons and a plurality of positive ions;
- a plurality of ring magnets for generating a magnetic field in the chamber having a component that is perpendicular to the first axis, wherein the plurality of ring magnets are arranged adjacent and in series so as to form a series of adjacent ring magnets in alignment with the first axis, and the plurality of ring magnets is arranged so that a polarity magnet of the plurality of ring magnets is opposite to a polarity of each adjacent ring magnet of the plurality of ring magnets in the series of adjacent ring magnets, wherein an electron gyroscopic frequency of the portion of plasma is larger than a particle collision frequency of the portion of plasma, such that, when the portion of plasma is passing through the chamber, the plurality of electrons are separated radially from the first axis and the plurality of position ions are allowed travel along the first axis thereby generating separated electrons and separated positive ions; and
- an ion thrusters that accelerates said separated positive ions thereby generating thrust.

* * * * *